(12) United States Patent
Chen

(10) Patent No.: US 7,063,343 B1
(45) Date of Patent: Jun. 20, 2006

(54) FRONT FORK DAMPER FOR BICYCLE

(75) Inventor: Leo Chen, Taichung (TW)

(73) Assignee: Spinner Industry Co., Ltd, Taichung (TW)

( * ) Notice: Subject to any disclaimer, the term of this patent is extended or adjusted under 35 U.S.C. 154(b) by 0 days.

(21) Appl. No.: 11/130,202

(22) Filed: May 17, 2005

(30) Foreign Application Priority Data

Mar. 15, 2005 (TW) .............................. 94204021 U

(51) Int. Cl.
*B62K 25/08* (2006.01)

(52) U.S. Cl. ...................... 280/276; 280/283; 188/280; 188/282.8

(58) Field of Classification Search ................ 188/280, 188/281, 282.1, 282.8, 322.14; 280/276, 280/279, 273
See application file for complete search history.

(56) References Cited

U.S. PATENT DOCUMENTS

| | | | | |
|---|---|---|---|---|
| 4,284,178 A * | 8/1981 | Tomita et al. | .............. | 188/281 |
| 4,971,344 A * | 11/1990 | Turner | ......................... | 280/276 |
| 5,094,324 A * | 3/1992 | Tsai | ............................ | 188/269 |
| 5,478,099 A * | 12/1995 | Kawahara | .................... | 280/276 |
| 5,848,675 A * | 12/1998 | Gonzalez | ................. | 188/319.2 |
| 6,026,939 A * | 2/2000 | Girvin et al. | ............ | 188/266.7 |
| 6,241,060 B1 * | 6/2001 | Gonzalez et al. | ......... | 188/319.2 |
| 6,360,858 B1 * | 3/2002 | Gonzalez et al. | ......... | 188/319.2 |
| 6,505,719 B1 * | 1/2003 | Gonzalez et al. | ......... | 188/319.2 |
| 2005/0151343 A1 * | 7/2005 | Fujita et al. | ................ | 280/276 |

* cited by examiner

*Primary Examiner*—Lesley D. Morris
*Assistant Examiner*—Matthew Luby
(74) *Attorney, Agent, or Firm*—Bacon & Thomas

(57) ABSTRACT

Disclosed is a front fork damper installed in a bicycle front fork formed of a fork pipe, a bottom case coupled and axially movable relative to the bottom case, and a hydraulic fluid filled in between the bottom case and the fork pipe. The front fork damper is joined to the bottom end of the fork pipe to buffer movement of the bottom case relative to the fork pipe in such a manner that the hydraulic fluid passes upwards through the front fork damper rapidly at a high flow rate, and passes downwards through the front fork damper slowly at a low flow rate.

7 Claims, 6 Drawing Sheets

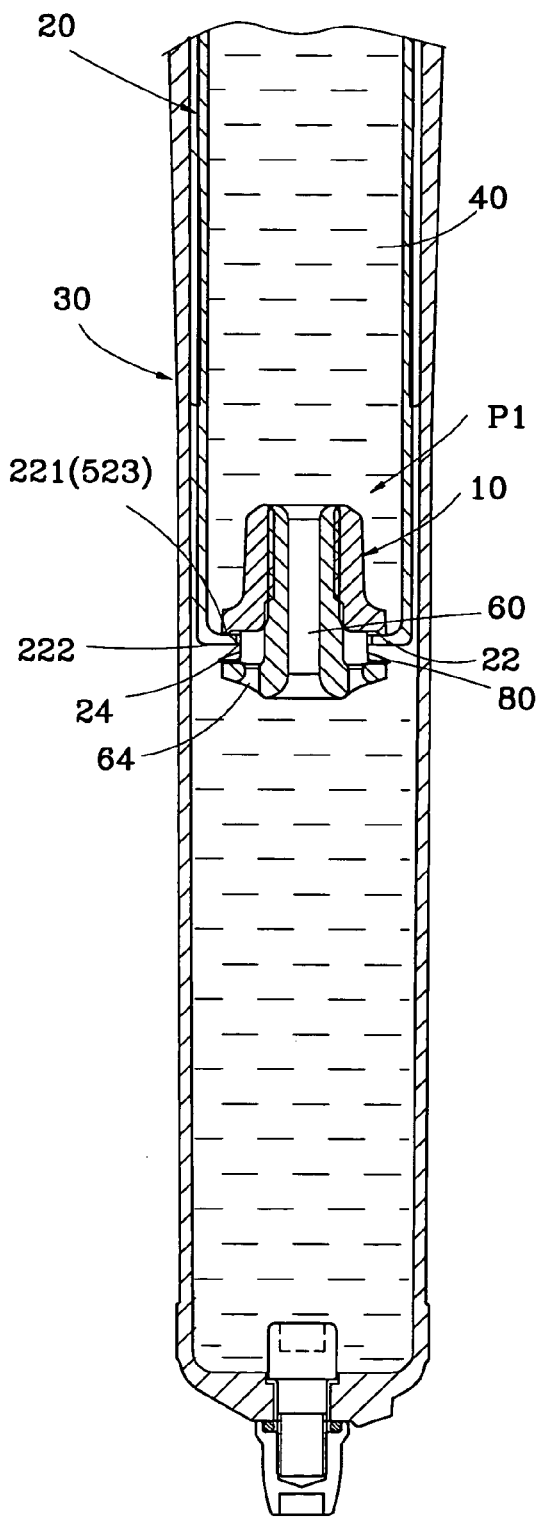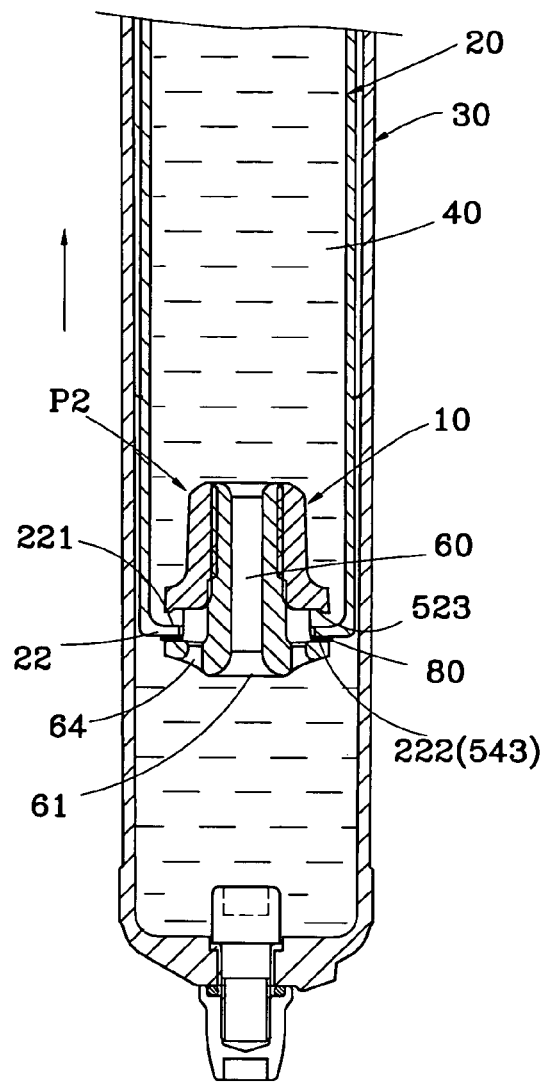
FIG.4
FIG.9

FRONT FORK DAMPER FOR BICYCLE

BACKGROUND OF THE INVENTION

1. Field of the Invention

The present invention relates to the parts of a bicycle and more specifically, to the front fork damper for bicycle.

2. Description of the Related Art

FIGS. 1 and 2 show the front fork damping structure of a bicycle according to the prior art. As illustrated, the front fork 1 comprises a fork pipe 2, a bottom case 3, a pipe seat 4, and a damper 5. The front fork 1 is filled up with a hydraulic fluid 6. The fork pipe 2 is inserted into the bottom case 3 and axially movable relative to the bottom case 3. When the bicycle is moving on a rough road surface, the fork pipe 2 is moved relative to the bottom case 3 heavily. In the following description, the fork pipe 2 is immovable, and the bottom case 3 is movable relative to the fork pipe 2. The pipe seat 4 has the bottom end thereof fixedly fastened to the bottom case 3. The top end of the pipe seat 4 is inserted into the inside of the fork pipe 2. The damper 5 is fixedly fastened to the top side of the pipe seat 4 below the level 6a of the hydraulic fluid 6, having a plurality of through holes 5a through the top and bottom sides.

The aforesaid damper 5 is a simple structure of damping device that buffers relative movement between the fork pipe 2 and the bottom case 3. Because the damper 5 has a simple structure, it is suitable for mass production to reduce the manufacturing cost. During upward or downward movement of the bottom case 3 relative to the fork pipe 2, the through holes 5a of the damper 5 are maintained opened for the passing of the hydraulic fluid 6 at a constant amount. Because the through holes 5a of the damper 5 allow passing of the hydraulic fluid 6 at a constant amount, the damping effect of the damper 5 is limited.

Therefore, it is desirable to provide a front fork damping structure that eliminates the aforesaid drawback.

SUMMARY OF THE INVENTION

The present invention has been accomplished under the circumstances in view. It is one object of the present invention to provide a front fork damper for bicycle, which provides a satisfactory damping effect.

It is another object of the present invention to provide a front fork damper for bicycle, which has a simple structure and is easy and inexpensive to manufacture.

To achieve these objects of the present invention, the front fork damper is installed in a bicycle front fork, which comprises a fork pipe and a bottom case coupled to the fork pipe and axially movable relative to the fork pipe. The fork pipe has a bottom end terminating in an inwardly protruding inside flange and a bottom center through hole surrounded by the inwardly protruding inside flange. The inwardly protruding inside flange has an inner stop face and an outer stop face. The fork pipe and the bottom case define therein a chamber holding a hydraulic fluid. The front fork damper comprises a damper body joined to the inwardly protruding inner flange of the fork pipe and movable between an upper limit position and a lower limit position, the damper body comprising a neck inserted through the bottom center through hole of the fork pipe, the neck having a top end and a bottom end, a first stop face radially outwardly formed at the top end of the neck, and a second stop face radially outwardly formed at the bottom end of the neck, the first stop face being stopped at the inner stop face of the inwardly protruding inner flange when the damper body is moved to the lower limit position, the second stop face being stopped at the outer stop face of the inwardly protruding inner flange when the damper body is moved to the upper limit position; a flow path formed in the damper body, the flow path having an opening in fluid communication with the inside space of the bottom case; at least one first through hole extending through the damper body, the at least one first through hole each having a first end in fluid communication with the inside space of the fork pipe and a second end in fluid communication with the flow path; and a plurality of second through holes extending through the damper body, the second through holes each having a first end in fluid communication with the inside space of the bottom case and a second end extending to the second stop face.

BRIEF DESCRIPTION OF THE DRAWINGS

FIG. 4 is an enlarged view of a part of FIG. 3, showing the damper moved to the lower limit position.

FIG. 9 is similar to FIG. 4, but showing the damper moved to the upper limit position.

DETAILED DESCRIPTION OF THE INVENTION

Figure 1:
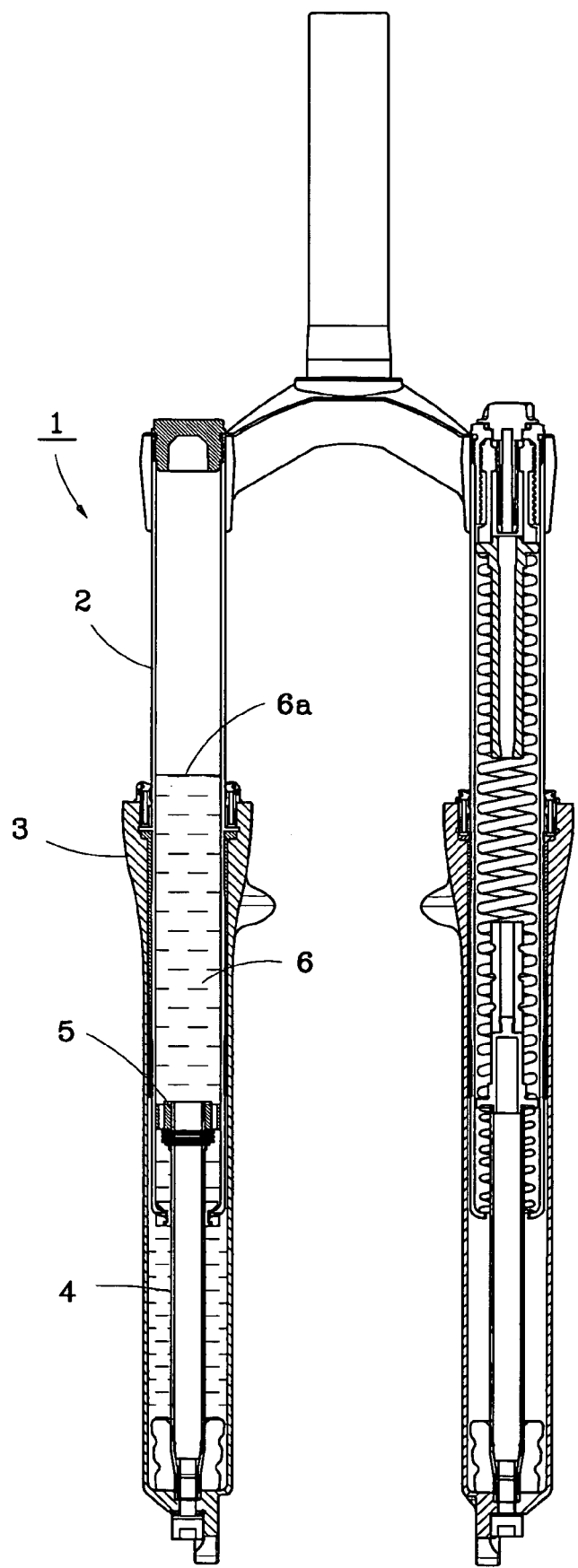
FIG. 1 is a sectional view of a bicycle front fork according to the prior art.
Figure 2:
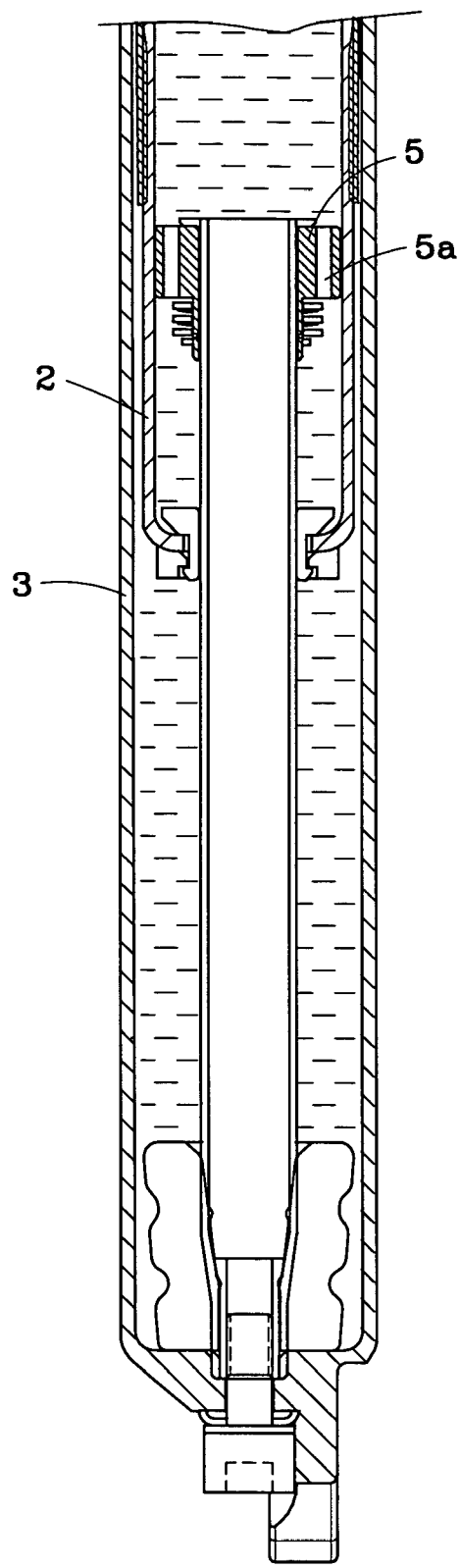
FIG. 2 is an enlarged view of a part of FIG. 1.
Figure 3:
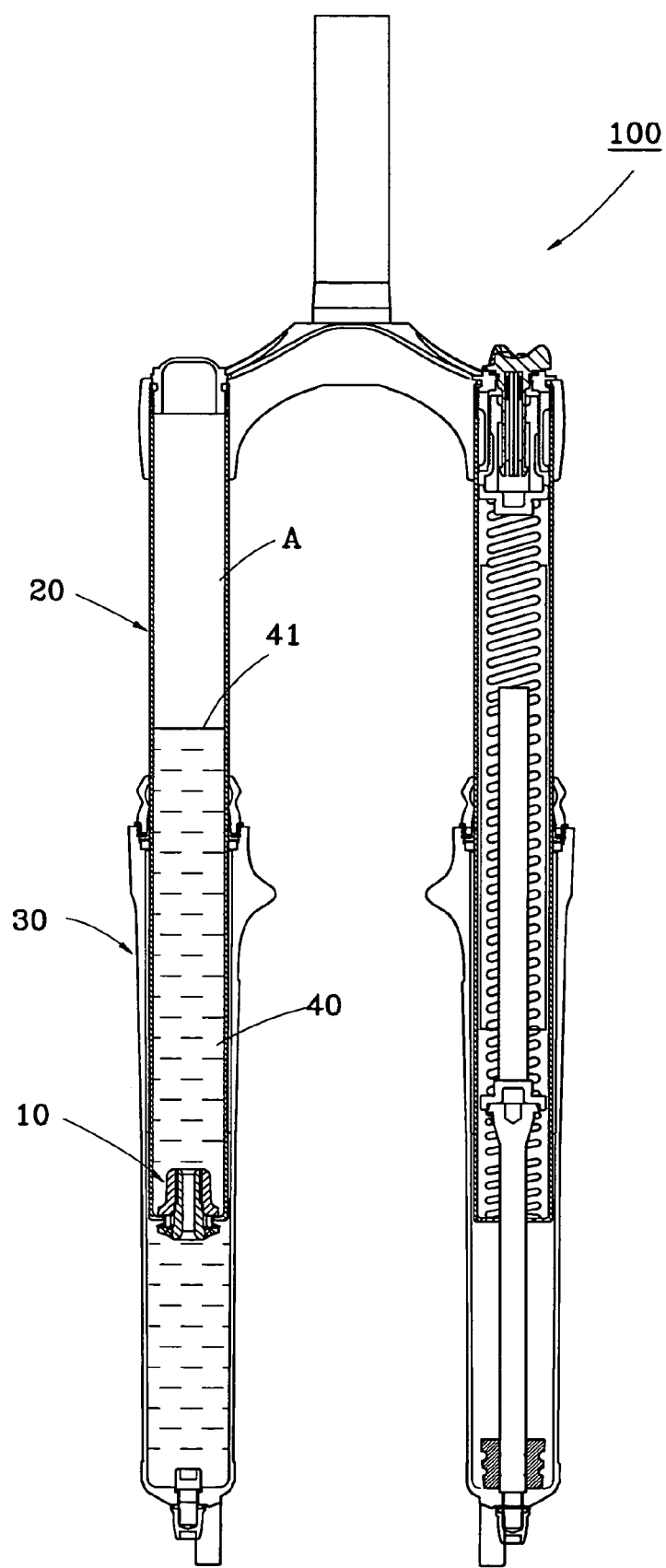
FIG. 3 is a sectional view of a bicycle front form constructed according to the present invention.
Figure 5:
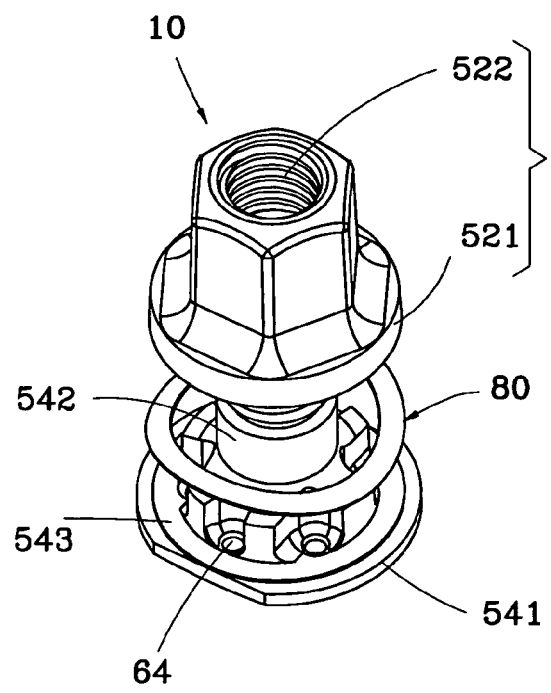
FIG. 5 is a perspective view of the damper according to the present invention.
Figure 6:
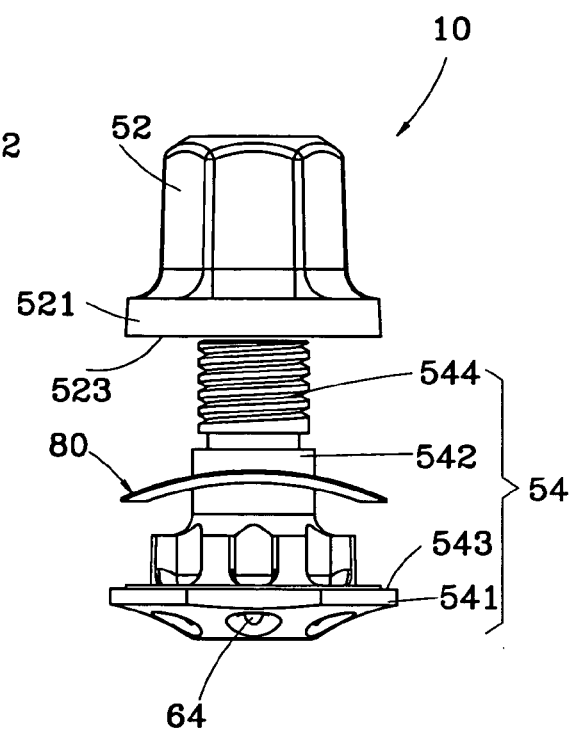
FIG. 6 is a side view of the damper before connection of outer guide member to the inner guide member.

Referring to FIG. 3, a damper 10 is shown installed in a bicycle front fork 100. The front fork 100 comprises a fork pipe 20 and a bottom case 30. The fork pipe 20 and the bottom case 30 are coupled together and axially movable relative to each other. The fork pipe 20 and the bottom case 30 define therein a chamber A, which holds a hydraulic fluid 40.

Referring to FIG. 4 and FIG. 3 again, the fork pipe 20 has a bottom end terminating in an inwardly protruding inside flange 22 and a bottom center through hole 24 surrounded by the inwardly protruding inside flange 22. The inwardly protruding inside flange 22 has an inner stop face 221 and an outer stop face 222. The damper 10 is joined to the inwardly protruding inside flange 22 of the fork pipe 20 below the level 41 of the hydraulic fluid 40.

Referring to FIGS. 5~8, the damper 10 comprises a damper body 50, a flow path 60, a first through hole 62, 6 second through holes 64, and a spring washer 80.

Figure 7:
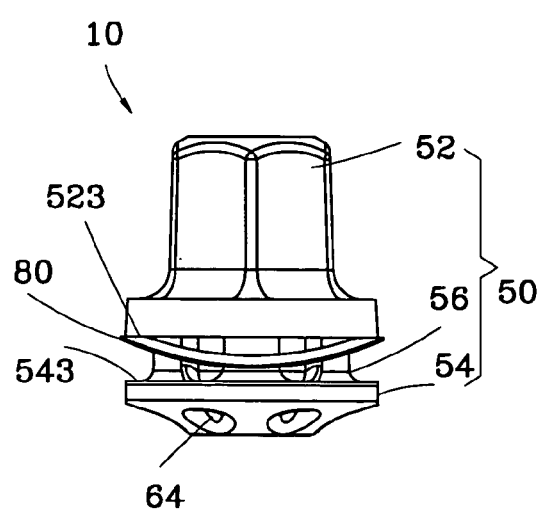
FIG. 7 corresponds to FIG. 6, showing the outer guide member fastened to the inner guide member.
Figure 8:
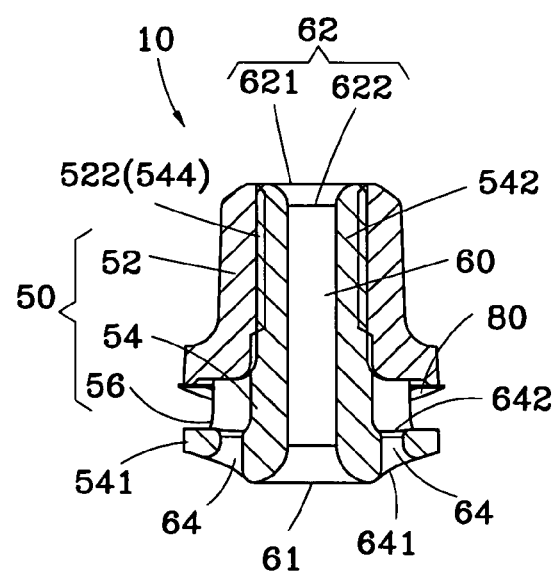
FIG. 8 is a sectional view of FIG. 7.

The damper body 50 is comprised of an inner guide member 52, an outer guide member 54, and a neck 56. The inner guide member 52 has a head 521, a screw hole 522 extending through the head 521, and a stop face 523 at the bottom side of the head 521. The outer guide member 54 has a head 541, a shank 542 perpendicularly upwardly extending from the head 541, a stop face 543 at the top side of the head 541 around the shank 542, and an outer thread 544 extending around the periphery of the shank 542 remote from the head 541. By means of threading the outer thread 544 into the screw hole 522, the outer guide member 54 is connected to the inner guide member 52, as shown in FIGS. 7 and 8, and the neck 56 is formed (of the shank 542) between the stop faces 523 of the inner guide member 52 and the stop face 543 of the outer guide member 54. The spring washer 8 is mounted on the neck 56 between the stop faces 523 of the inner guide member 52 and the stop face 543 of the outer guide member 54 (the spring washer 8 is mounted on the shank 542 before connection of the outer guide member 54 to the inner guide member 52.

The flow path 60 and the first through hole 62 are formed inside the outer guide member 54 and coaxially connected in line, i.e., the flow path 60 and the first through hole 62 are formed at the same time the outer guide member 54 is produced. As shown in FIG. 8, the first through hole 62 is formed in the shank 542 at the top side. The first through hole 62 has a first end 621 and a second end 622. The first end 621 is formed in the top side of the shank 542. The second end 622 is connected to the flow path 60. The flow path 60 has an opening 61 formed in the bottom side of the head 541 of the bottom guide member 54. The second through holes 64 are formed in the outer guide member 54 at the same time the outer guide member 54 is made. The second through holes 64 each have a first end 641 formed in the head 541 of the outer guide member 54 at an outer side relative to the opening 61 and facing the bottom side of the bottom case 30, and a second end 642 formed in the stop face 543 of the outer guide member 54.

Referring to FIG. 4 again, before movement of the bottom case 30 relative to the fork pipe 20, the spring washer 80 is set between the outer stop face 222 of the inwardly protruding inner flange 22 of the fork pipe 20 and the stop face 543 of the outer guide member 54 to force the stop face 523 of the inner guide member 52 into contact with the inner stop face 221 of the inwardly protruding inner flange 22 of the fork pipe 20. At this time, the damper 10 is defined positioned in the lower limit position P1.

When the bicycle is moving on a rough surface and the bottom case 30 is suddenly forced upwards relative to the fork pipe 20, the distance between the bottom side of the bottom case 30 and the damper 10 is shortened, thereby causing the hydraulic fluid 40 to push the damper 10 upwards and to deform the spring washer 80 as shown in FIG. 9. At this time, the stop face 523 of the inner guide member 52 is spaced from the inner stop face 221 of the inwardly protruding inner flange 22 of the fork pipe 20, and the stop face 543 of the outer guide member 54 is forced into contact with the outer stop face 222 of the inwardly protruding inner flange 22 of the fork pipe 20. The position of the damper 10 at this time is defined to be the upper limit position P2.

When the damper 10 is moved from the lower limit position P1 (see FIG. 4) to the upper limit position P2 (see FIG. 9), the hydraulic fluid 40 passes upwards from the space below the damper 10 to the space above the damper 10 rapidly at a high flow rate through the passage way formed of the flow path 60 and the first through hole 62 and the second through holes 64. When the bottom case 30 is moved downwards relative to the fork pipe 20, the damper 10 is moved from the upper limit position P2 (see FIG. 9) to the lower limit position P1 (see FIG. 4), the stop face 523 of the inner guide member 52 is forced into contact with the inner stop face 221 of the inwardly protruding inner flange 22 of the fork pipe 20 again. At this time, the hydraulic fluid 40 above the damper 10 cannot pass through the second through holes 64 and can only move through the passage way formed of the flow path 60 and the first through hole 62, and therefore only a relatively smaller amount of the hydraulic fluid 40 flows from the space above the damper 10 to the space below the damper 10 at a relatively slower speed.

As indicated above, the damper 10 allows the hydraulic fluid 40 to pass from the space below the damper 10 to the space above the damper 10 rapidly at a high flow rate and to flow back from the space above the damper 10 to the space below the damper 10 slowly at a low flow rate during reciprocating movement of the bottom case 30 relative to the fork pipe 20, a satisfactory damping effect is achieved. Further, the structure of the damper 10 is simple, suitable for mass production to reduce the manufacturing cost. Because the spring member is elastically deformable, the damper body 50 is steadily joined to the fork pipe 20, eliminating noises during reciprocating motion of the bottom case 30 relative to the fork pipe 20.

Figure 10:
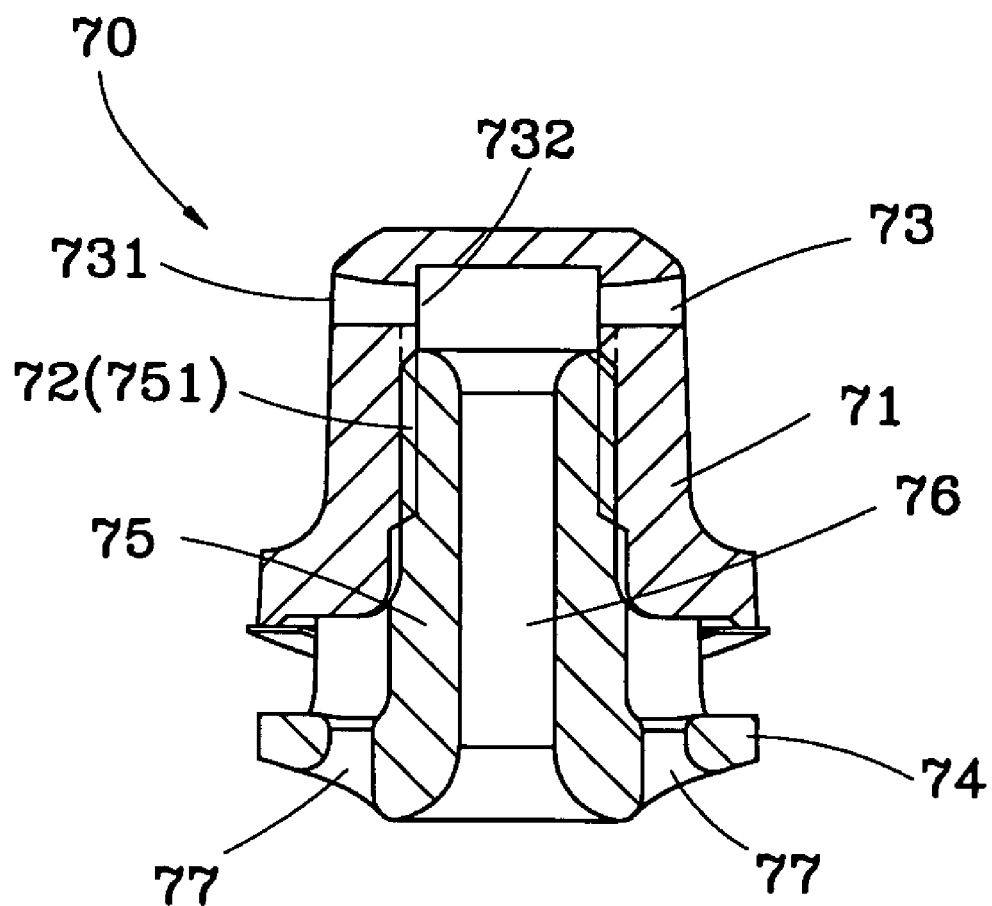
FIG. 10 is a sectional view of an alternate form of the damper according to the present invention.

FIG. 10 shows an alternate form of the present invention. According to this embodiment, the damper, referenced by 70 is substantially similar to the aforesaid damper 10 with the exception of the following features. The top side of the inner guide member 71 is a close side, i.e., the screw hole 72 does not cut through inner guide member 71. The inner guide member 71 has three through holes 73. Each through hole 73 has a first end 731 disposed at one side of the inner guide member 71, and a second end 732 connected to the screw hole 72. The outer guide member 74 comprises a shank 75, which has an outer thread 751 threaded into the screw hole 72. After installation, the top side of the shank 75 does not touch the inner side of the inner guide member 71, however the through holes 73 are maintained in fluid communication with the flow path 76. Further, the outer guide member 74 has six through holes 77. Because the number of the through holes 77 is greater than the number of the through holes 73, the hydraulic fluid is controlled to pass through the damper 70 upwards/downwards at different flow rates and speeds, thereby achieving a satisfactory damping effect.

What is claimed is:

1. A front fork damper installed in a bicycle front fork, said bicycle front fork comprising a fork pipe and a bottom case coupled to said fork pipe and axially movable relative to said fork pipe, said fork pipe having a bottom end terminating in an inwardly protruding inside flange and a bottom center through hole surrounded by said inwardly protruding inside flange, said inwardly protruding inside flange having an inner stop face and an outer stop face, said fork pipe and said bottom case defining therein a chamber holding a hydraulic fluid, the front fork damper comprising:

a damper body joined to said inwardly protruding inner flange of said fork pipe and movable between an upper limit position and a lower limit position, said damper body comprising a neck inserted through the bottom center through hole of said fork pipe, said neck having a top end and a bottom end, a first stop face radially outwardly formed at the top end of said neck, and a second stop face radially outwardly formed at the bottom end of said neck, said first stop face being stopped at said inner stop face of said inwardly protruding inner flange when said damper body is moved to said lower limit position, said second stop face being stopped at said outer stop face of said inwardly protruding inner flange when said damper body is moved to said upper limit position;

a flow path formed in said damper body, said flow path having an opening in fluid communication with the inside space of said bottom case;

at least one first through hole extending through said damper body, the at least one first through hole each having a first end in fluid communication with the inside space of said fork pipe and a second end in fluid communication with said flow path; and a plurality of second through holes extending through said damper body, said second through holes each having a first end in fluid communication with the inside space of said bottom case and a second end extending to said second stop face.

2. The front fork damper as claimed in claim 1, wherein said damper body is comprised of an inner guide member and an outer guide member connected to said inner guide member, said inner guide member comprising a head, the head of said inner guide member having a bottom surface that forms said first stop face, said outer guide member comprising a head and a shank perpendicularly extending from the head of said outer guide member and connected to the head of said inner guide member, the head of said outer guide member having a top face that forms said second stop face, said shank forming said neck between said first stop face and said second stop face; the opening of said flow path is formed in a bottom face of the head of said outer guide member.

3. The front fork damper as claimed in claim 2, wherein said inner guide member has a screw hole; said shank of said outer guide member has an outer thread threaded into the screw hole of said inner guide member.

4. The front fork damper as claimed in claim 3, wherein the screw hole of said inner guide member is a through hole extending through said inner guide member; said at least one first through hole is formed in said shank and axially connected to said flow path; the first end of each of said at least one first through hole extends to a top side of said shank.

5. The front fork damper as claimed in claim 3, wherein the screw hole of said inner guide member has a closed top end; said at least one first through hole is respectively formed in said inner guide member, each having the respective first end disposed at one side of said inner guide member.

6. The front fork damper as claimed in claim 5, wherein the number of said at least one first through hole is smaller than the number of said second through holes.

7. The front fork damper as claimed in claim 1, further comprising a spring washer mounted on said damper body around said neck.

* * * * *